Feb. 12, 1929.
E. H. BOSS
1,701,606
SUPPORTING HORSE
Filed Oct. 8, 1927
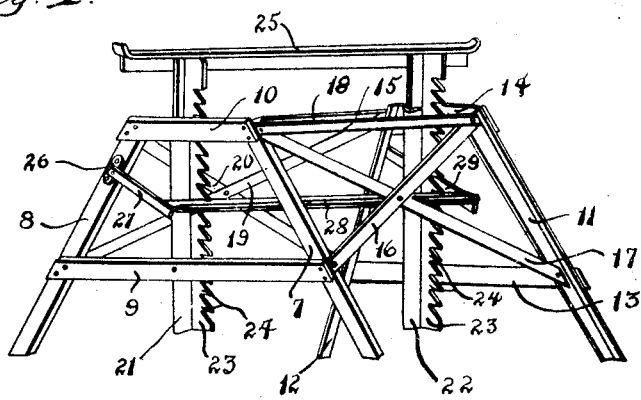
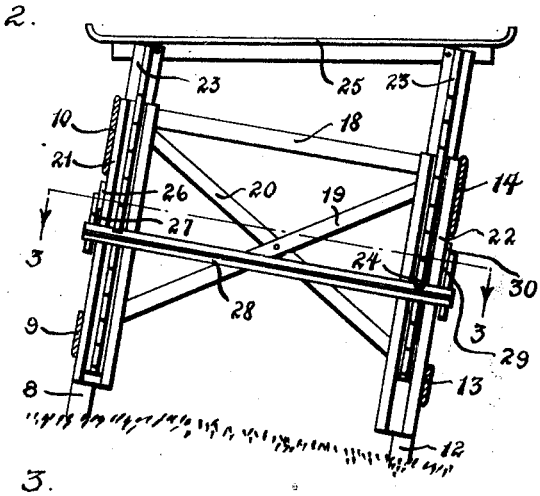
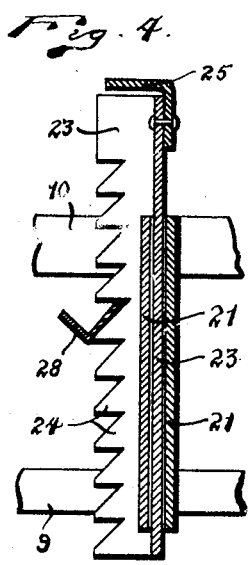
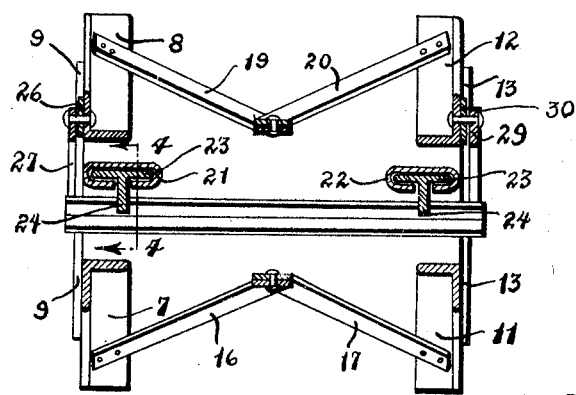
INVENTOR.
Edward H. Boss
BY
ATTORNEY.

Patented Feb. 12, 1929.

1,701,606

UNITED STATES PATENT OFFICE.

EDWARD H. BOSS, OF DETROIT, MICHIGAN.

SUPPORTING HORSE.

Application filed October 8, 1927. Serial No. 224,842.

My invention relates to a new and useful improvement in a supporting horse and has for its object the provision of a horse of this type which will be simple in structure, economical of manufacture, and highly efficient and durable in use.

Another object of the invention is the provision of a horse of this type which may be adjusted to various heights and which may be in its various positions of adjustment inclined relatively to the horizontal.

Another object of the invention is the provision in a horse of this class of supporting legs depending from the engagement portion and provided with teeth for engaging the bight of a swingably mounted U-shaped member so that the teeth on each of the legs may be engaged and released from engagement simultaneously.

Other objects will appear hereinafter.

The invention consists in the combinations and arrangement of parts hereinafter described and claimed.

The invention will be best understood by a reference to the accompanying drawings which form a part of this specification and in which, Fig. 1 is a perspective view of the invention.

Fig. 2 is a central sectional longitudinal view of the invention showing it positioned on uneven ground.

Fig. 3 is a sectional view taken on substantially line 3—3 of Fig. 2.

Fig. 4 is a fragmentary sectional view taken on line 4—4 of Fig. 3.

The invention comprises end frames. As shown in Fig. 1 these end frames comprise upwardly converging supports 7 and 8 which are preferably made from T iron and which are joined together intermediate their ends by the cross bar 9 and at their upper ends by the cross bar 10. At the opposite side of the device the frame comprises the upwardly converging supports 11 and 12 which are joined together intermediate their ends by bar 13 and adjacent their upper ends by the bar 14.

A bar 15 serves to connect at one side the upper end of the supports 11 and 7, and diagonally extended crossing braces 16 and 17 also serve to connect the supporting members. A longitudinally extending bar 18 serves to connect the supports 12 and 8 together adjacent their upper ends and these supports are also connected by the cross braces 19 and 20. Secured to the cross bars 9 and 10 and the bar 18 is the vertically extended, channel-bearing, guide member 21, and secured to the cross bars 13 and 14 and the bar 18 is the channel-bearing, guide member 22, these guide members being in alignment with each other.

Slidably mounted in the guide members 21 and 22 are T irons 23 having teeth 24 formed thereon and secured at their upper ends to the engagement bar 25 which is preferably made from angle iron, the members 23 serving as supports.

Mounted upon the support 8 is a reinforcing plate 26 at the point of pivotal mounting on the support 8 of the arm 27, this arm 27 being fixedly mounted at its opposite end to a locking bar 28 preferably made from angle iron. The opposite end of the locking bar 28 is fixedly connected to the free end of the arm 29 which is swingably mounted on the support 12, this support 12 carrying a reinforcing plate 30.

In use the device may be utilized for the various purposes to which a supporting hoist is usually put. By the adjustable feature, however, the engaging bar 25 may be maintained at different angles relatively to the supports 7 and 8 and 11 and 12, this resulting from the fact that the engaging bar 25 is pivotally mounted at the upper ends of the T irons 23. A construction such as this lends itself particularly for use in supporting conveyors, platforms, and the like which are carried over uneven surfaces and should be maintained in a horizontal plane. The adaptation of the invention for this purpose is quite clearly illustrated in Fig. 2. By forming the locking bar 28 in connection with the arms 27 and 29 to comprise a U-shaped member it is evident that the locking bar may be disengaged from the teeth of both the T irons simultaneously. This is particularly useful in releasing the supporting bar 25 for sliding downwardly as both T irons 23 may be released for downward slidable movement simultaneously.

The construction of the invention in the manner indicated formed preferably from T iron and angle iron is one which affords the maximum strength and at the same time a minimum weight.

While I have illustrated and described the preferred form of my invention, I do not wish to limit myself to the precise details of structure shown but desire to avail myself of such variations and modifications as come within the scope of the appended claims.

Having thus described my invention what I claim as new and desire to secure by Letters Patent is:

1. An adjustable horse of the class described, comprising: a frame; guide members extending vertically of said frame at opposite sides thereof; a support slidably mounted in each of said guide members, a portion of each of said supports projecting outwardly from said guide members and provided with downwardly directed teeth; an engagement member pivotally mounted intermediate its ends at the upper end of each of said supports; a U-shaped member swingably mounted on said frame and adapted for engaging at its bight said teeth, and preventing downward movement of said supports relatively to said frame, the upward swinging of said U-shaped member disengaging from the teeth of each of said supports simultaneously.

2. An adjustable horse of the class described, comprising: a frame; vertically extending guide members at opposite sides of said frame; a T-shaped support slidably mounted in each of said guide members, the trunk thereof projecting outwardly from said guide members and being provided with downwardly directed teeth; an engagement bar pivotally connected, intermediate its ends, to the upper end of each of said supports; a U-shaped locking member swingably mounted on said frame and adapted, upon downward swinging, for engaging at its bight said teeth and locking said supports against downward movement, said supports being adjustable to different relative heights for retaining said engagement member at an incline to said guide members.

3. An adjustable horse of the class described, comprising: a frame; vertically extending guide members on opposite sides of said frame; a T-shaped support slidably mounted in each of said guide members, the trunk thereof projecting outwardly from said guide members and being provided with downwardly directed teeth; an engagement bar pivotally connected, intermediate its ends, to the upper end of each of said supports; a U-shaped locking member swingably mounted at the ends of its legs on said frame, the legs thereof embracing said supports, said locking member being adapted, upon downward swinging, for engaging at its bight said teeth and locking said supports against downward movement, said supports being adjustable to different relative heights for retaining said engagement member at an inclination to said guide members.

4. An adjustable horse of the class described, comprising: a frame having at its opposite ends inclined, upwardly converging supporting members; braces for connecting said supporting members; vertically extending guide members at opposite sides of said frame; a T-shaped support slidably mounted in each of said guide members, the trunk thereof projecting outwardly from said guide members and being provided with downwardly directed teeth; an engagement bar pivotally connected, intermediate its ends, to the upper end of each of said supports; a U-shaped locking member swingably mounted at the ends of its legs on said supporting members and adapted, upon downward swinging, for engaging at its bight said teeth and locking said supports against downward movement.

In testimony whereof I have signed the foregoing specification.

EDWARD H. BOSS.